United States Patent
Uehara et al.

(10) Patent No.: US 9,909,625 B2
(45) Date of Patent: Mar. 6, 2018

(54) DAMPER DEVICE

(71) Applicants: Nissan Motor Co., Ltd., Yokohama-shi, Kanagawa (JP); EXEDY Corporation, Neyagawa-shi, Osaka (JP)

(72) Inventors: Hiroki Uehara, Kanagawa (JP); Yuuzou Akasaka, Kanagawa (JP); Makoto Ogata, Kanagawa (JP); Yoshinari Yoshimura, Osaka (JP); Takeshi Senoue, Osaka (JP)

(73) Assignees: Nissan Motor Co., Ltd., Yokohama (JP); Exedy Corporation, Osaka (JP)

( * ) Notice: Subject to any disclaimer, the term of this patent is extended or adjusted under 35 U.S.C. 154(b) by 121 days.

(21) Appl. No.: 14/914,834

(22) PCT Filed: Sep. 13, 2013

(86) PCT No.: PCT/JP2013/074847
§ 371 (c)(1),
(2) Date: Feb. 26, 2016

(87) PCT Pub. No.: WO2015/037125
PCT Pub. Date: Mar. 19, 2015

(65) Prior Publication Data
US 2016/0201729 A1 Jul. 14, 2016

(51) Int. Cl.
F16F 15/121 (2006.01)
F16D 3/12 (2006.01)
F16F 15/123 (2006.01)

(52) U.S. Cl.
CPC .......... *F16D 3/12* (2013.01); *F16F 15/12326* (2013.01); *F16D 2200/0078* (2013.01)

(58) Field of Classification Search
CPC ................. F16F 15/12326; F16D 3/12; F16D 2200/0076
(Continued)

(56) References Cited

U.S. PATENT DOCUMENTS 3,169,757 A * 2/1965 Roder ..................... F16F 1/122
267/170
8,021,234 B2 * 9/2011 Oono ................ F16F 15/12326
464/68.92

(Continued)

FOREIGN PATENT DOCUMENTS

CN 100593649 C 3/2010
EP 1 975 456 A1 10/2008
(Continued)

*Primary Examiner* — Gregory J Binda
(74) *Attorney, Agent, or Firm* — Global IP Counselors, LLP

(57) ABSTRACT

A damper device is provided with a first rotating body, a second rotating body, a coil spring and a spring seat. The coil spring is interposed in a circumferential direction between the first and second rotating bodies. The resin spring seat includes a metallic core member inside. The resin spring seat has a seat portion and an overhang portion. The metallic core member has an overhang metallic core part that has a low-rigidity portion and a high-rigidity portion. The low-rigidity portion is provided on a side close to the seat portion with a relatively lower rigidity. The high-rigidity portion is provided on a side far from the seat portion with a relatively higher rigidity.

10 Claims, 9 Drawing Sheets

(58) Field of Classification Search
USPC ...... 464/68.92; 192/205; 267/169, 170, 178, 267/179
See application file for complete search history.

(56) References Cited

U.S. PATENT DOCUMENTS

| | | |
|---|---|---|
| 8,029,370 B2 | 10/2011 | Oona et al. |
| 2004/0119218 A1 | 6/2004 | Imanaka et al. |
| 2016/0208863 A1* | 7/2016 | Fujii ......................... F16D 3/12 |
| 2016/0223026 A1* | 8/2016 | Uehara .................... F16D 3/12 |

FOREIGN PATENT DOCUMENTS

| | | | | |
|---|---|---|---|---|
| GB | 473839 | * | 10/1937 | ................. 464/68.92 |
| GB | 2 194 019 | * | 2/1988 | ................. 464/68.92 |
| JP | 2008-249007 A1 | | 10/2008 | |

\* cited by examiner

DAMPER DEVICE

CROSS-REFERENCE TO RELATED APPLICATIONS

This application is a U.S. National stage application of International Application No. PCT/JP2013/074847, filed Sep. 13, 2013.

BACKGROUND

Field of the Invention

The present invention relates to a damper device, provided to a transmission system or the like of a vehicle, and comprising a spring seat that supports a coil spring which absorbs torsional vibration.

Background Information

Conventionally, a damper device to which is inputted the drive force of the engine having a resin spring seat comprising a metal core therein as a spring seat for supporting a coil spring, is known (refer to, for example, Japanese Laid Open Patent Application No. 2008-249007). In this conventional damper device, a plurality of coil springs are interposed between a first rotating body and a second rotating body in the circumferential direction, and the two ends of each coil spring are seated on the rotating bodies via a spring seat. In addition, the spring seat comprises a seat portion on which the axial ends of the coil spring are seated, and an overhang portion provided on the axis of this coil spring in the radial direction. The overhang portion is configured to suppress a deformation of the coil spring in the outer diameter direction caused by centrifugal force, when centrifugal force is applied to the coil spring accompanying a rotation of the damper device. Accordingly, the metal core has a structure having a strength capable of suppressing deformation of the overhang portion and the coil spring.

SUMMARY

However, in the prior art described above, when one with a relatively low elastic modulus is used as the coil spring in order to obtain a damper device with low rigidity, the following problems occur. That is, in the prior art described above, the overhang portion of the spring seat is structured to restricting the deformation of the coil spring in the outer diameter direction due to centrifugal force. Consequently, if one with a low elastic modulus is used as the coil spring, there is a risk for excessive deformation to occur between a site that is restricted from deforming by the overhang portion and a site outside of this restriction range, when the coil spring is deformed in the device outer diameter direction. On the other hand, if the overhang portion is made low rigidity in order to solve this problem, there is the risk that the overhang portion will be damaged by an input from the coil spring.

In view of the problem described above, an object of the present invention is to provide a damper device capable of achieving an improvement in the durability of the overhang portion and the coil spring, while allowing the overhang portion of the spring seat to deform, following the coil spring.

In order to achieve the above-described objective, a damper device of the present invention is provided with a resin spring seat having a metallic core member inside, that supports a coil spring, which is interposed between a first rotating body and a second rotating body in the circumferential direction, comprises a seat portion on which the coil spring is seated, and an overhang portion which is extended from an outer diameter direction end of this seat portion toward the circumferential direction, and an overhang metallic core part that is extended in the circumferential direction in the overhang portion comprises a low-rigidity portion that is provided on a side close to the seat portion in the circumferential direction with a relatively lower rigidity, and a high-rigidity portion that is provided on a side far from the seat portion in the circumferential direction with a relatively higher rigidity.

In the present invention, when the rotating bodies of the damper device is rotated and the coil spring is deformed in the device outer diameter direction, the coil spring applies pressure to the overhang portion in the device outer diameter direction. In this case, the overhang portion is capable of deforming following a deformation of the coil springs, based on the rigidity of the low-rigidity portion provided on the side close to the seat portion of the overhang metallic core part. Therefore, in each of the coil springs, excessive deformation can be suppressed from occurring between a site that abuts the overhang portion and that is covered by the overhang portion and a site that is not covered by the overhang portion, to suppress damages in the coil spring caused by excessive deformation. On the other hand, a high-rigidity portion is provided to the overhang metallic core part on the distal end portion side, which is the side of the overhang portion far from the seat portion and which is relatively strongly pressed by the coil springs; therefore, damages to the overhang portion can be suppressed when this pressing force is repeatedly inputted.

BRIEF DESCRIPTION OF THE DRAWINGS

Referring now to the attached drawings which form a part of this original disclosure.

DETAILED DESCRIPTION OF THE EMBODIMENTS

Embodiments for realizing a damper device of the present invention will be explained below based on the drawings.

First Embodiment

Figure 1:
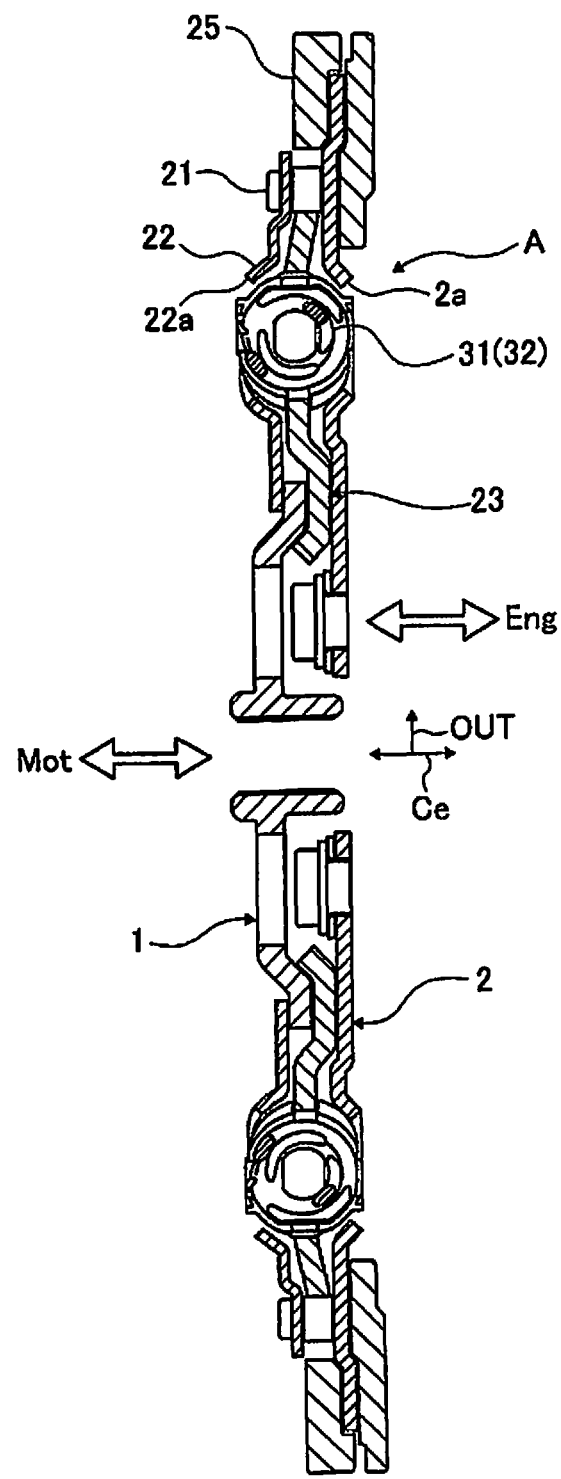
FIG. 1 is a longitudinal cross-sectional view of the damper device of the first embodiment.

First, a configuration of a damper device A in accordance with a first embodiment will be described based on FIG. 1-FIG. 3. FIG. 1 is a cross-sectional view of the damper device A, FIG. 2 is an exploded perspective view of the damper device A, and FIG. 3 is a cross-sectional view illustrating the main parts of the damper device A.

The damper device A is a mechanism for transmitting the torque as well as for absorbing and damping the torsional vibration, and is provided on a drive power transmission path between a motor Mot and an engine Eng, which are not shown, in the present first embodiment. That is, while not shown, the damper device A is provided to the drive power transmission system of a hybrid vehicle. Then, when driving the engine Eng, transmitting the engine drive force to the motor Mot side and generating power, etc., and further, transmitting the engine drive force to the unillustrated drive wheel side via the motor Mot, etc., are possible. In addition, the engine can be started by inputting the drive force of the motor Mot to the engine Eng, when the engine Eng is not being driven. At the time of this type of drive transmission, the damper device A mainly carries out absorption and damping of torsional vibration that is generated with the driving of the engine Eng.

Figure 2:
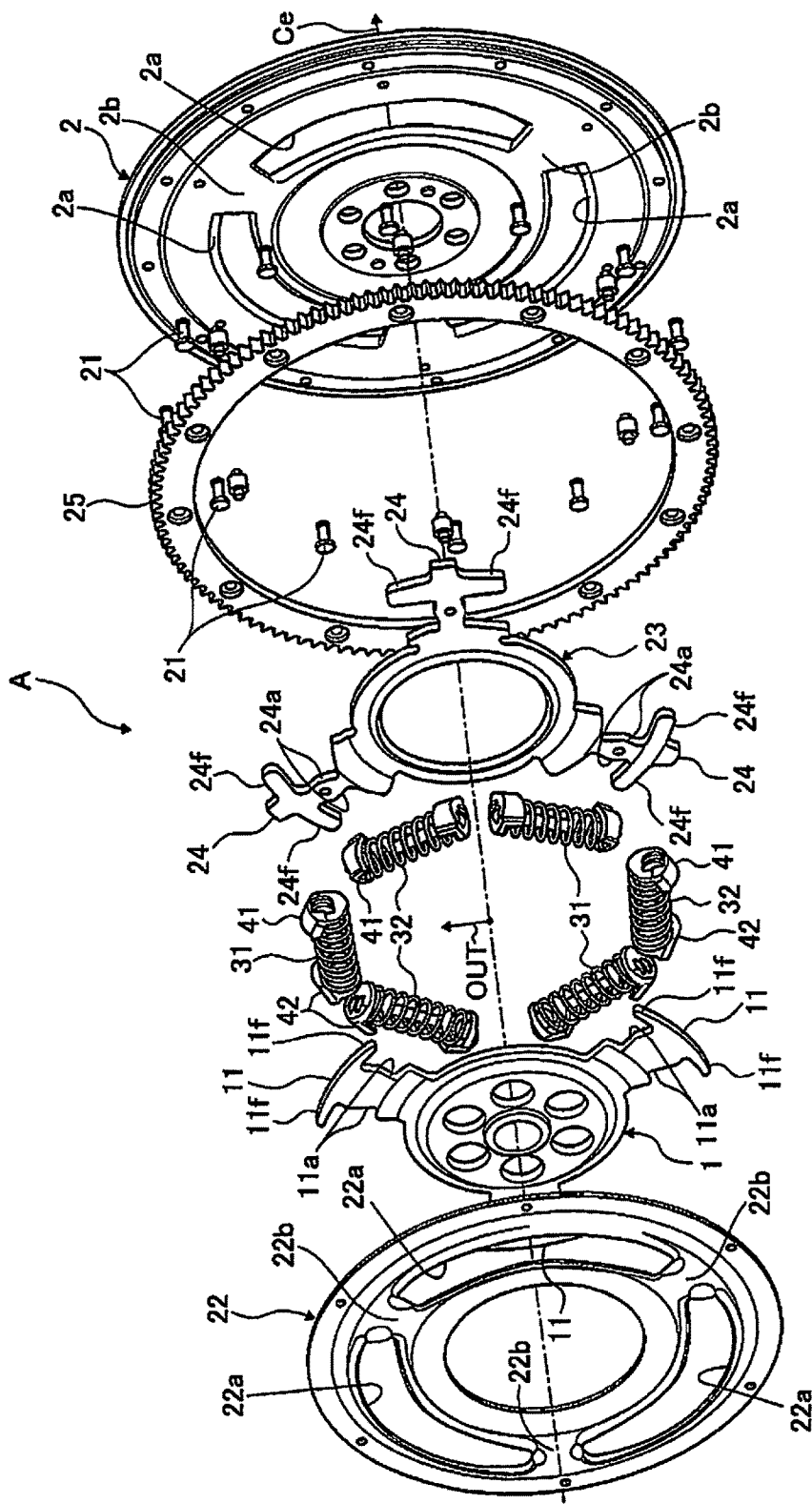
FIG. 2 is an exploded perspective view of the damper device of the first embodiment.
Figure 3:
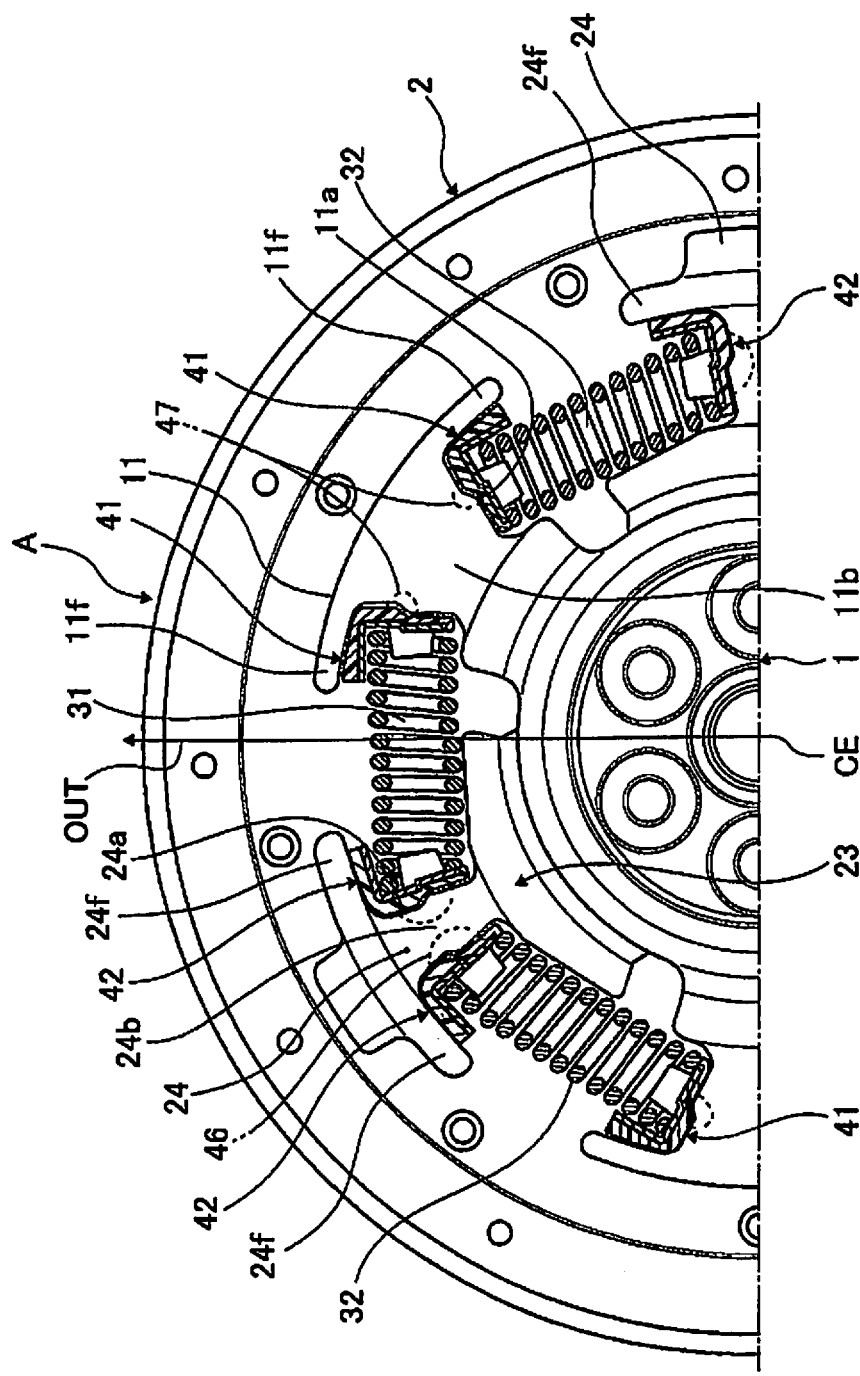
FIG. 3 is a cross sectional view illustrating the main parts of the damper device of the first embodiment, illustrating a state in which the spring seat is cut at the end surface position of the hub plate and the intermediate plate.

The damper device A comprises a hub plate (first rotating body) 1 that is connected to the motor Mot so as to be inputtable and outputtable, and an input-output plate (second rotating body) 2 that is connected to the engine Eng so as to be inputtable and outputtable, as illustrated in FIG. 1 and FIG. 2. Then, three pairs of a first coil spring 31 and a second coil spring 32 are interposed between the two plates 1, 2 in the circumferential direction. That is, along with the hub plate 1 and the input-output plate 2 moving relatively in the circumferential direction, one of the first coil spring 31 and the second coil spring 32 is compressed while the other is stretched. The torsional vibration that is inputted to the hub plate 1 and the input-output plate 2 is absorbed and damped by the elastic deformation of these coil springs 31, 32. A clutch which connects/disconnects the transmission of the drive force may be provided between the hub plate 1 and the unillustrated motor Mot.

A second plate 22 is fixed to the input-output plate 2 by a plurality of rivets 21 sandwiching an intermediate plate 23 therebetween, on the motor side in the axial direction of the damper device A, and in the arrow Ce direction in FIG. 1 and FIG. 2 (this direction is hereinafter referred to as the device axial direction). Then, three pairs of housing windows 2a, 22a which house the pairs of coil springs 31, 32 in the circumferential direction are extended on the input-output plate 2 and on the second plate 22 in the circumferential direction. Connecting portions 2b which connect the inside and outside in the device radial direction (the radial direction of the damper device A; the arrow OUT indicates the outer diameter direction) are provided between the housing windows 2a of the input-output plate 2 in the circumferential direction. Similarly, connecting portions 22b which connect the inside and outside in the device radial direction are provided between the housing windows 22a of the second plate 22 in the circumferential direction.

Three intermediate plate-side support arms 24 which extend in the outer diameter direction are provided to the intermediate plate 23, at regular intervals in the circumferential direction. In the present embodiment, each of the intermediate plate-side support arms 24 is disposed in an intermediate portion of the housing windows 2a, 22a in the circumferential direction. A gear member 25 for starting the engine is joined to the outer perimeter of the input-output plate 2 by a plurality of rivets 21. Thus, the second plate 22, the intermediate plate 23, and the gear member 25 are integrally rotated with the input-output plate 2.

Three hub plate-side support arms 11 which extend in the outer diameter direction are provided to the hub plate 1, at regular intervals in the circumferential direction, in the same way as the intermediate plate 23. These hub plate-side support arms 11 are disposed in positions between the housing windows 2a, 22a, in the circumferential direction. Thus, the hub plate-side support arms 11 and the intermediate plate-side support arms 24 are alternately arranged in the circumferential direction.

In addition, the intermediate plate-side support arms 24 of the intermediate plate 23 and the hub plate-side support arms 11 of the hub plate 1 are relatively movable in the circumferential direction, and the two coil springs 31, 32 described above are interposed between the support arms 11, 24 in the circumferential direction. Both of the coil springs 31, 32 are alternately disposed between both support arms 11, 24 in the circumferential direction, and when one set from among the set of three first coil springs 31 and the set of three second coil springs 32 is compressed in parallel, the other set is stretched in parallel, as illustrated in FIG. 3.

Next, the attachment structure of both of the coil springs 31, 32 with respect to the support arms 11, 24 and the configuration of the two spring seats 41, 42 will be described. Both of the coil springs 31, 32 are respectively attached to the hub plate-side support arms 11 via a first spring seat 41, and attached to the intermediate plate-side support arms 24 via the second spring seat 42.

Figure 4A:
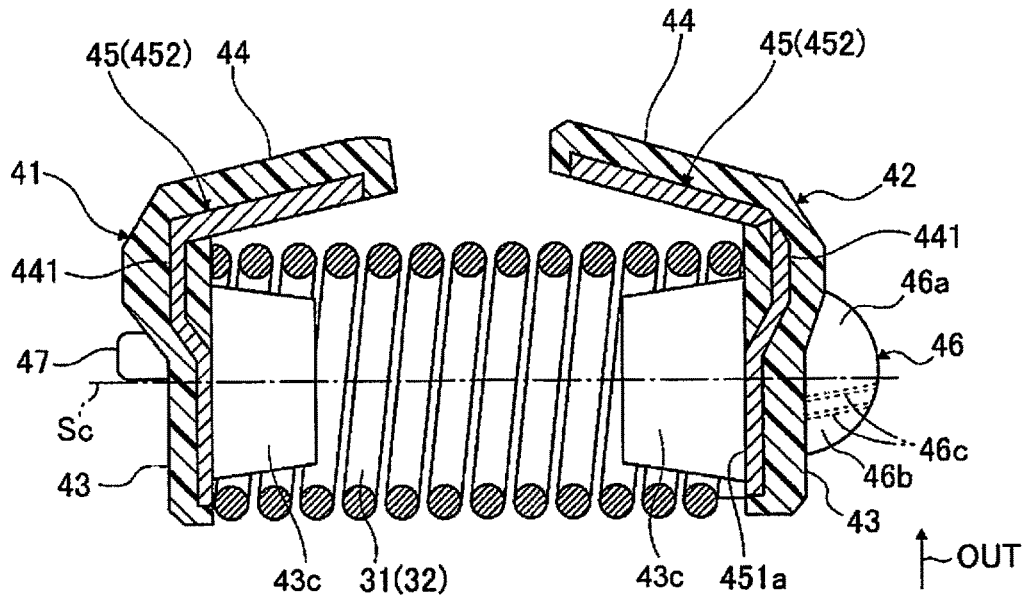
FIG. 4A is a front view illustrating the main parts of the damper device of the first embodiment, illustrating a state in which centrifugal force is not applied to the coil spring.
Figure 4B:
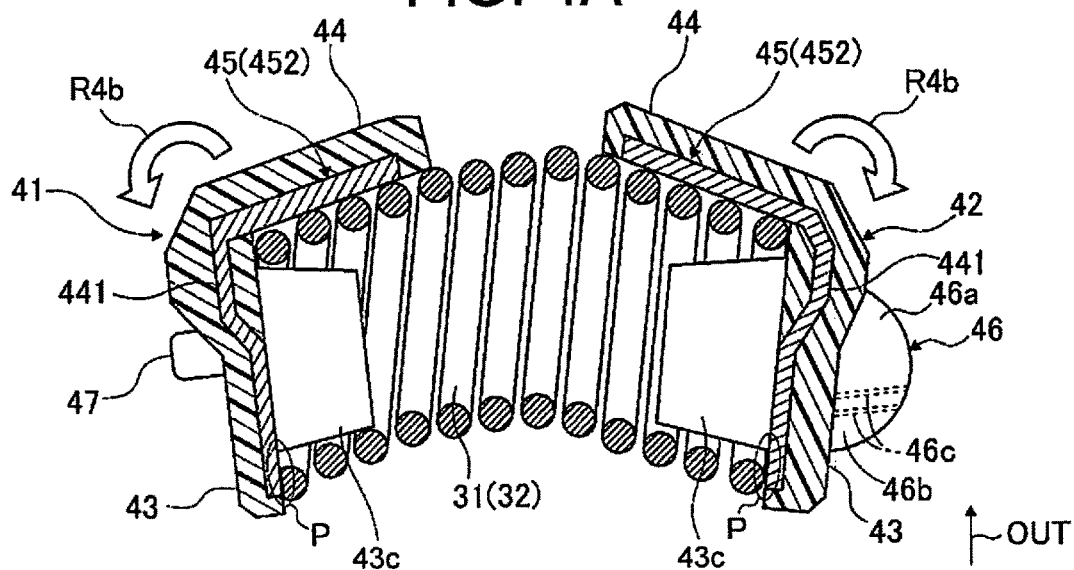
FIG. 4B is a front view illustrating the main parts of the damper device of the first embodiment, illustrating a state in which centrifugal force is applied to the coil spring, which is deformed in the device outer diameter direction.

First, configurations common to both of the spring seats 41, 42 will be described. The two spring seats 41, 42 are formed by carrying out molding in which a metallic core member 45, described below, is covered by a resin with low friction resistance, and comprise a seat portion 43 and an overhang portion 44, respectively, as illustrated in FIG. 4A and FIG. 4B.

Figure 5:
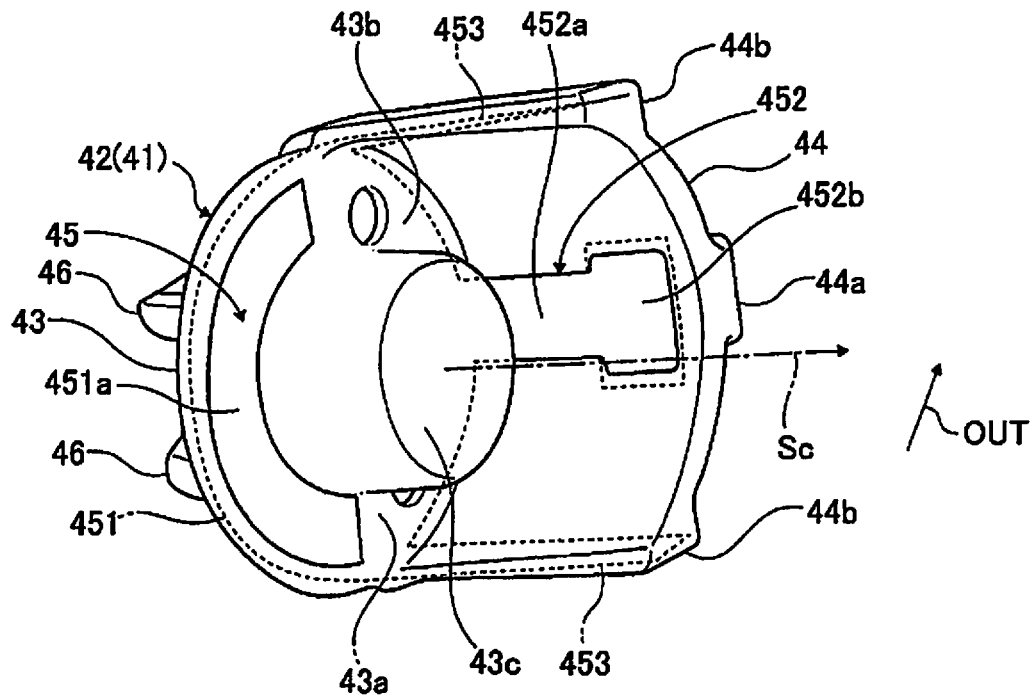
FIG. 5 is a perspective view of a second spring seat of the damper device of the first embodiment.

The seat portion 43 is for supporting the ends of the two coil springs 31, 32 in the spring central axis Sc direction, and is formed in a substantially disc shape, as illustrated in FIG. 5. A guide protrusion 43c, which is inserted in the inner perimeter of the ends of the coil springs 31, 32 to restrict the movement of the coil springs 31, 32 in the radial direction, is formed projecting from the radial direction center of the spring seating surface 43a, on which are seated the coil springs 31, 32.

The overhang portion 44 is formed along the outer perimeter part of the seat portion 43, extended in the axial direction from an area of substantially half the portion on the device outer diameter direction (the arrow OUT direction in FIG. 3) side. This overhang portion 44 is for suppressing the coil springs 31, 32 from deforming in the damper outer diameter direction due to the centrifugal force during a rotation of the damper device A, and is formed so as to cover the device outer diameter direction side of the coil springs 31, 32. In addition, ribs 44a, 44b, 44b are provided in three locations, in the circumferential direction center and the two circumferential ends, of the overhang portion 44, extending in the axial direction (along the spring central axis Sc direction, illustrated by the dashed-dotted line in FIG. 5), as illustrated in FIG. 5.

The metallic core member 45 is formed of a thin metal plate, and includes a seat metallic core seat part 451, an overhang metallic core part 452, and a pair of side edge reinforcement arm parts 453, 453 that are formed integrally, as illustrated in FIG. 5. The metallic core seat part 451 is embedded in the seat portion 43, and is formed in a disc shape that is smaller in diameter than the seat portion 43. The overhang metallic core part 452 is the top portion of the overhang portion 44 in the device outer diameter direction, and is disposed inside of the rib 44a. The side edge reinforcement arm part 453 is disposed along the rib 44b on the two circumferential ends of the arc of the overhang portion 44, and is formed in a rod shape that is narrower in width than the overhang metallic core part 452.

Figure 6:
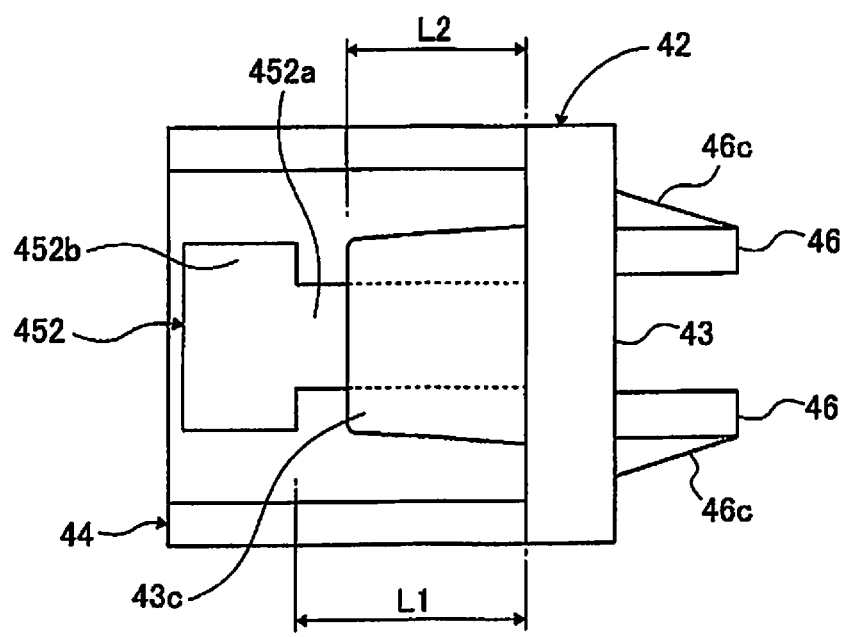
FIG. 6 is a bottom surface view of the second spring seat when viewing the device outer diameter direction from the device inner diameter direction.

The overhang metallic core part 452 comprises a low-rigidity portion 452a on the side close to the seat portion 43, and a high-rigidity portion 452b on the side far from the seat portion 43, on the distal end side of the overhang portion 44. In the present first embodiment, the difference in the rigidity between the low-rigidity portion 452a and the high-rigidity portion 452b is set by the difference in the width of the metal plate member that forms the overhang metallic core part 452, where the high-rigidity portion 452b is formed wider than the low-rigidity portion 452a. Then, in the first embodiment, in order to impart this difference in width, the overhang metallic core part 452 is formed in a T-shape in plan view, as illustrated in FIG. 6.

Additionally, in the first embodiment, the dimension L1 of the low-rigidity portion 452a in the protruding direction of the overhang portion is formed to be larger in dimension than the axial direction dimension L2 of the guide protrusion 43c. Therefore, the low-rigidity portion 452a is provided to a side position of the overhang portion 44 that is further in the distal direction than the distal end of the guide protrusion 43c, in the circumferential direction. Additionally, the high-rigidity portion 452b is provided to a position of the overhang portion 44 that is further on the distal end side than the distal end of the guide protrusion 43c, in the circumferential direction.

In addition, in the first embodiment, the overhang metallic core part 452 is exposed in the device inner diameter direction (direction opposite of the arrow OUT) with respect to the resin material that forms the overhang portion 44. On the other hand, the side edge reinforcement arm part 453 is entirely embedded with respect to the resin material that forms the overhang portion 44, as illustrated in FIG. 5.

Next, the seat portion 43 will be described. In the seat portion 43, a metallic core exposed portion 451a, in which the metallic core seat part 451 is exposed so as to be contactable with the coil springs 31, 32, is provided to the portion of the spring seating surface 43a that comes in contact with the coil springs 31, 32, as illustrated in FIG. 5. In the present first embodiment, this metallic core exposed portion 451a is provided to a site on the spring seating surface 43a that comes in strong contact with the coil springs 31, 32. That is, the metallic core exposed portion 451a is disposed further on the device inner diameter direction (the direction opposite of the arrow OUT illustrated in FIG. 4A, FIG. 4B) side position than the spring central axis Sc of the coil springs 31, 32 on the spring seating surface 43a. In addition, in the first embodiment, the metallic core exposed portion 451a is provided in a semicircular arc shape along a wound-shape circumferential portion of the spring seating surface 43a, where the ends of the coil springs 31, 32 are abutted. On the other hand, a region on the spring seating surface 43a that includes the region further on the device outer diameter direction side than the spring central axis Sc, excluding the metallic core exposed portion 451a, is set as the coated region 43b in which the metallic core seat part 451 is coated by resin.

Next, the attachment structure of the two spring seats 41, 42 with respect to the hub plate-side support arms 11 and the intermediate plate-side support arms 24 illustrated in FIG. 3 will be described. Two attaching recesses 11a, 24a, which are recessed in the circumferential direction, are formed on each of the support arms 11, 24, so as to allow housing of the ends of the coil springs 31, 32 as well as the spring seats 41, 42. Attaching portions 11b, 24b for attaching the spring seats 41, 42 are provided to a portion sandwiched by the pair of attaching recesses 11a, 24a, in the circumferential direction. Flanges 11f, 24f are extended in the circumferential direction on the outer diameter direction side of the attaching recesses 11a, 24a.

To each of the spring seats 41, 42 are provided a pair of clamping protrusions 47, 46 that sandwich the attaching portions 11b, 24b of the support arms 11, 24 in the axial direction, on the outside surface which is on the opposite side of where the guide protrusion 43c is provided in the seat portion 43.

Figure 9:
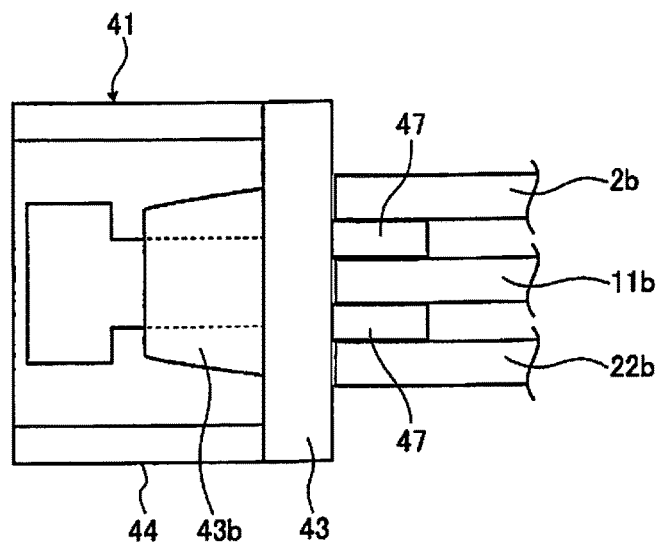
FIG. 9 is a bottom surface view illustrating the attachment structure by the clamping protrusion of the first spring seat in the damper device of the first embodiment, when viewing the device outer diameter direction from the device inner diameter direction.

The clamping protrusion 47 provided to the first spring seat 41 is formed in a relatively smaller shape than the clamping protrusion 46 of the second spring seat 42, as illustrated in FIG. 4A and FIG. 4B. That is, the hub plate-side support arms 11 which are sandwiched by the clamping protrusions 47 are configured so that the connecting portion 2b of the input-output plate 2 and the connecting portion 22b of the second plate 22 are disposed on both sides thereof in the device axial direction (arrow Ce direction), as illustrated in FIG. 2. Therefore, the pair of clamping protrusions 47 sandwich the attaching portion 11b, and are further sandwiched by the connecting portions 2b, 22b, as illustrated in FIG. 9. Thus, the attachment strength of the hub plate-side support arms 11 of the first spring seat 41 to the attaching portion 11b can be sufficiently secured even with a relatively small clamping protrusion 47.

On the other hand, the connecting portions 2b, 22b do not exist in the axial direction of the intermediate plate-side support arms 24 of the intermediate plate 23, and the second spring seat 42 is attached to the intermediate plate-side support arm 24 only by a pair of clamping protrusions 46. Therefore, the clamping protrusion 46 of the second spring seat 42 is formed to have a relatively larger shape than the clamping protrusion 47 of the first spring seat 41, in order to secure the attachment strength thereof.

Figure 7A:
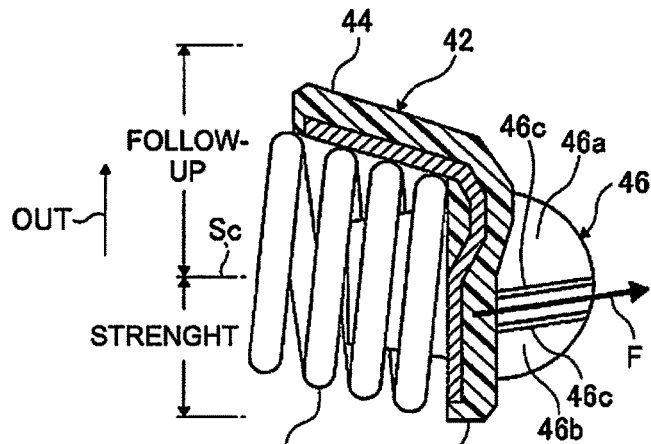
FIG. 7A is an operation explanatory view of the damper device of the first embodiment, illustrating a state in which the main parts are viewed from the device axial direction when there is an input in the device axial direction, in a state in which the coil spring is deformed in the device outer diameter direction.

The configuration of the clamping protrusion 46 of the second spring seat 42 will be described in further detail below. The interval between the pair of clamping protrusions 46, 46 in the device axial direction is configured to be an interval with which sandwiching the attaching portion 24b is possible; by sandwiching the attaching portion 24b in this way, the movement of the second spring seat 42 in the device axial direction (arrow Ce direction) is regulated, as illustrated in FIG. 6. In addition, since the two clamping protrusions 46, 46 are only sandwiching the attaching portion 24b, the support is one in which relative rotation is possible in the device outer diameter direction, which is the arrow R4b direction in FIG. 4B, with respect to the attaching portion 24b. Then, the clamping protrusion 46 is formed in a semicircular shape, which is an arc shape along the turning trajectory in the outer diameter direction, when viewed from the device axial direction, as illustrated in FIG. 7A.

In addition, the clamping protrusion 46 comprises a low-rigidity portion 46a and a high-rigidity portion 46b. The low-rigidity portion 46a is provided to the clamping protrusion 46 on the side that is close to the overhang portion 44, in a region that is further on the device outer diameter direction side than the spring central axis Sc. The spring central axis Sc of FIG. 7A indicates the central axis in a state in which the coil springs 31, 32 are not deformed in the device outer diameter direction, as illustrated in FIG. 4A. This low-rigidity portion 46a is set to a rigidity that can permit the overhang portion 44 to be elastically deformed in the device outer diameter direction and the device axial direction.

The high-rigidity portion 46b is formed to be higher in rigidity than the low-rigidity portion 46a by erecting two ribs 46c, 46c on the outer side of the clamping protrusion 46 in the spring central axis Sc direction. In addition, these ribs 46c, 46c are provided inclined obliquely with respect to the spring central axis Sc, as illustrated in FIG. 7A. This inclination is a direction along an input direction (arrow F direction) from the coil springs 31, 32, when the coil springs 31, 32 are displaced in the device outer diameter direction by centrifugal force. Furthermore, the two ribs 46c, 46c are juxtaposed in the device outer diameter direction and the device inner diameter direction, across the input direction indicated by this arrow F.

Next, the actions of the first embodiment will be described. When drive transmission is carried out between the engine Eng and the motor Mot, the rotation of one of the input-output plate 2 and the hub plate 1 is transmitted to the other via the coil springs 31, 32.

At this time, centrifugal force acts on the coil springs 31, 32 accompanying the rotation of the two plates 1, 2. While the spring central axis Sc of the coil springs 31, 32 are substantially in a straight line during non-rotation, as illustrated in FIG. 4A, during rotation, the springs are elastically deformed so that the center portions swell in the device outer diameter direction, due to the centrifugal force, as illustrated in FIG. 4B.

In addition, during an elastic deformation of the coil springs 31, 32 in the device outer diameter direction, the two spring seats 41, 42 are turned in the outer diameter direction due to backlash, etc., introduced upon assembly, with respect to the attaching recesses 11a, 24a of the plates 1, 2 of the support arms 11, 24. That is, with the overhang portions 44 being pressed by the two coil springs 31, 32 in the device outer diameter direction, the two spring seats 41, 42 will try to turn with respect to the plates 1, 2, in the direction indicated by the arrow R4b in FIG. 4B. In addition, since the two spring seats 41, 42 are made of elastic resin, elastic deformation occurs in the arrow R4b direction, and the overhang portions 44 are deformed so as to displace the distal end thereof in the outer diameter direction. Furthermore, the seat portions 43 are also elastically deformed outwardly of the spring with respect to the spring central axis Sc, accompanying the deformation of the overhang portions 44.

Figure 8:
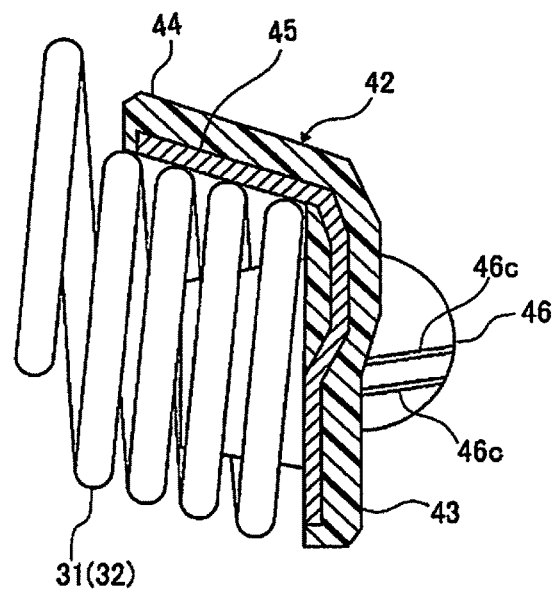
FIG. 8 is a view illustrating an operation of a comparative example, to explain the action of the damper device of the first embodiment.

In addition, during the deformation of both of the coil springs 31, 32 in the device outer diameter direction described above, the coil springs 31, 32 and the spring seats 41, 42 are relatively displaced, to generate rubbing between the two. During this rubbing, since the spring seats 41, 42 are made of resin, the friction resistance that is generated at the time of the rubbing can be kept low. Compared to when the friction resistance during rubbing is great, it is possible to suppress the generation of positional displacement with respect to the spring seats 41, 42 or excessive deformation such as shown in FIG. 8, in the coil springs 31, 32.

Next, the wear of the resin portion of the two spring seats 41, 42 at the time of deformation will be described. When the coil springs 31, 32 are deformed in the device outer diameter direction, if a strong contact against the resin spring seats 41, 42 is repeated, there is the risk that wear will occur in the resin portion.

There are two locations in the spring seats 41, 42, where such wear can occur in the resin portion, due to repeated strong contact and sliding with the coil springs 31, 32. One location is the device inner diameter direction surface of the overhang portion 44, and the other location is the spring seating surface 43a of the seat portion 43. Countermeasures against wear in the first embodiment will be described below.

The two coil springs 31, 32 contact the inner side surfaces of the overhang portions 44, when deforming in the device outer diameter direction (arrow OUT direction), as illustrated in FIG. 4B. When this contact force is strong, friction is generated on the inner side surfaces of the overhang portions 44 (device inner diameter direction side surface). In contrast, in the present first embodiment, the overhang portion 44 exposes the overhang metallic core part 452 on the inner perimeter surface of the apex portion in the device outer diameter direction. Accordingly, when deforming in the device outer diameter direction, the coil springs 31, 32 directly contact the overhang metallic core part 452 in the portions that come in strong contact, thereby avoiding friction in the resin portion.

Furthermore, when the coil springs 31, 32 are deformed in the device outer diameter direction, as illustrated in FIG. 4B, the device inner diameter direction side indicated by the circle P comes in stronger contact with the seat portion 43 than the device outer diameter direction side at the two ends in the direction along the spring central axis Sc. That is, in the portion where the guide protrusion 43c is inserted in the coil springs 31, 32, the deformation in the device outer diameter direction is restricted by the guide protrusion 43c. On the other hand, in each of the coil springs 31, 32, a larger deformation occurs in a position that is further separated from the seat portion 43 than the distal end of the guide protrusion 43c, compared to the portion that is regulated by the guide protrusion 43. Accordingly, in each of the spring seats 41, 42, when the overhang portions 44 are pushed by the coil springs 31, 32, a turning moment in the direction of displacement in the device outer diameter direction is generated in the seat portions 43, along with the overhang portions 44. Therefore, as described above, when the coil springs 31, 32 are deformed in the device outer diameter direction, as illustrated in FIG. 4B, the device inner diameter direction side indicated by the circle P comes in stronger contact with the seat portions 43 than the device outer diameter direction side. In this case, there is the risk that more wear in the resin is generated on the device inner diameter direction side, indicated by the circle P, than the device outer diameter direction side of the spring seating surface 43a.

In contrast, in the present first embodiment, a semicircular metallic core exposed portion 451a formed along the arc of the coil springs 31, 32 is provided to the spring seating surface 43a of the seat portion 43 further on the inner diameter side than the spring central axis Sc. Therefore, even when the coil springs 31, 32 and the device inner diameter direction of the spring seating surface 43a come in strong contact, occurrence of wear in the resin can be prevented.

Next, the deformation action of the spring seats 41, 42 in the device outer diameter direction, when the above-described coil springs 31, 32 are deformed in the device outer diameter direction will be described. In the overhang portions 44, the input from both of the coil springs 31, 32 is stronger on the distal end side, where deformation is likely to occur, when the coil springs 31, 32 are deformed in the device outer diameter direction. Therefore, there is the risk that a tip split occurs in the distal end portion, when this deformation is repeated or when the deformation amount is increased at the distal end portions of the overhang portions 44. In contrast, in the present first embodiment, in addition to providing the above-described overhang metallic core part 452 to the overhang portion 44, the overhang metallic core part 452 is provided with a high-rigidity portion 452b on the distal end side of the overhang portion 44. Accordingly, excessive deformation of the distal end of the overhang portion 44 is suppressed by the high-rigidity portion 452b and an occurrence of the tip split described above is suppressed.

On the other hand, the overhang metallic core part 452 is provided with a low-rigidity portion 452a on the side that is close to the seat portion 43. Therefore, compared to when the entire overhang metallic core part 452 is configured to be highly rigid to allow suppression of the tip split described above, deformation of the spring seats 41, 42 in the arrow R4b direction in FIG. 4B becomes likely to occur, following a deformation of the coil springs 31, 32 in the device outer diameter direction. It is thereby possible to ease the input to both the coil springs 31, 32 and the overhang portions 44 at the time of contact, and to suppress an occurrence of excessive deformation in the coil springs 31, 32, such as that illustrated in FIG. 8. Therefore, damages, etc., to the coil springs 31, 32 and the spring seats 41, 42 can be suppressed to improve durability.

Additionally, in the present first embodiment, the low-rigidity portion 452a is provided to a position that is further on the distal end side of the overhang portion 44 than the distal end of the guide protrusion 43c, as illustrated in FIG. 6. That is, in the portion where the guide protrusion 43c is inserted in the coil springs 31, 32, the deformation in the device outer diameter direction is restricted to a certain degree, and deformation in the device outer diameter direction is more likely to occur on the distal end side of the overhang portion 44 than the guide protrusion 43c. Therefore, if a high-rigidity portion 452b is disposed further up to the base side of the overhang portion 44 than the distal end position of the guide protrusion 43c, the deformation of the coil springs 31, 32 in the device outer diameter direction will be suppressed by the high-rigidity portion 452b. In contrast, in the present first embodiment, the low-rigidity portion 452a is disposed up to a position that is further on the distal end side of the overhang portion 44 than the distal end position of the guide protrusion 43c, and the high-rigidity portion 452b is disposed further on the distal end side of the overhang portion 44 than the distal end position of the guide protrusion 43c. Deformation of the spring seats 41, 42 becomes more likely to occur, following the deformation of the coil springs 31, 32 in the device outer diameter direction. Therefore, excessive deformation of the coil springs 31, 32 such as that illustrated in FIG. 8 can be more reliably suppressed, and damages, etc., to the coil springs 31, 32 and the spring seats 41, 42 can be suppressed to improve durability.

Next, the action of when the coil springs 31, 32 are deformed in the device axial direction (arrow Ce direction of FIG. 1 and FIG. 2) will be described. Since the intermediate plate 23 is connected to the engine Eng, there are cases in which the intermediate plate receives an input in the axial direction (arrow Ce direction of FIG. 1 and FIG. 2) caused by engine vibration, during input from the engine Eng, as described in FIG. 1. In particular, in the case that a gear member 25 for starting the engine is provided to the input-output plate 2 while the coil springs 31, 32 are held, input from the engine Eng is directly transmitted from the input-output plate 2 to the coil springs 31, 32, which increases this input. When there is vibration input to the intermediate plate 23 in this manner, a relative displacement occurs in the axial direction between the support arms 11, 24; in this case, the coil springs 31, 32 are relatively displaced in the device axial direction between the support arms 11, 24.

With respect to the relative displacement of the two ends of the coil springs 31, 32 in the device axial direction, since the clamping protrusion 47 in the first spring seat 41 is sandwiched by the connecting portions 2b, 22b and the attaching portion 11b, as illustrated in FIG. 9, a relatively high attachment strength can be achieved. Accordingly, even if deformed and displaced in the device outer diameter direction and the device axial direction, the first spring seat 41 will not be easily damaged or detach from the attaching portion 11b.

In contrast, the second spring seat 42 attached to the intermediate plate-side support arm 24 is configured so that a pair of clamping protrusions 46, 46 sandwich the attaching portion 24b, and the attachment strength is relatively low. Therefore, in the second spring seat 42, different operations are carried out according to the difference in the input positions from the coil springs 31, 32. This difference in the input positions occurs due to the presence/absence of displacement of the second spring seat 42 and the coil springs 31, 32 in the device outer diameter direction.

Figure 7B:
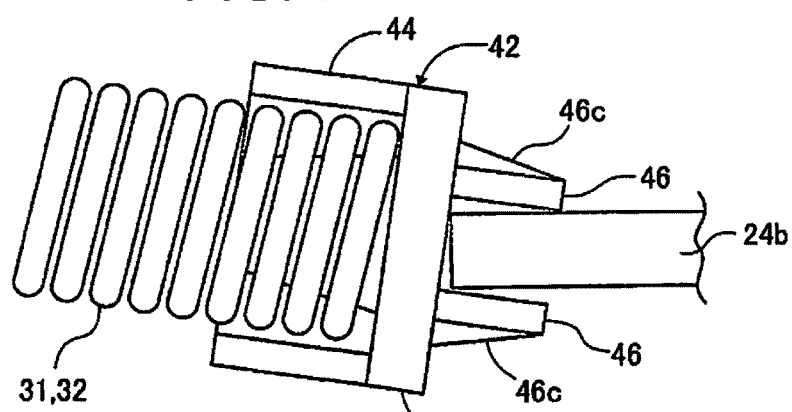
FIG. 7B is an operation explanatory view of the damper device of the first embodiment, illustrating a state in which the outer diameter direction is viewed from the inner diameter direction during the operation illustrated in FIG. 7A.
Figure 7C:
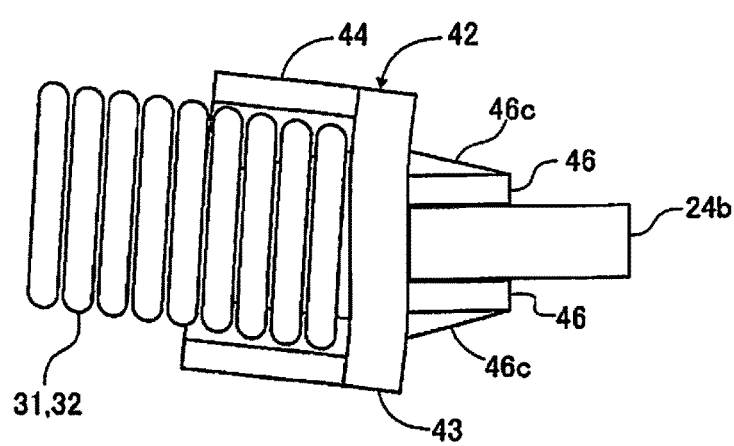
FIG. 7C is an operation explanatory view of the damper device of the first embodiment, illustrating a state in which the inner diameter direction is viewed from the outer diameter direction, when there is an input in the device axial direction, in a state in which the coil spring is not deformed in the device outer diameter direction.

Therefore, the actions are separately described below according to the presence/absence of displacement in the device outer diameter direction, which causes the difference in the input positions. First, a case in which deformation in the device outer diameter direction is not generated in the coil springs 31, 32 will be described. In this case, the contact state between the coil springs 31, 32 and the seat portion 43 is substantially uniform around the entire perimeter, and the input of the intermediate plate-side support arm 24 and the coil springs 31, 32 is carried out in the vicinity of the spring central axis Sc. Then, when a displacement in the axial direction occurs between the two plates 1, 2, the second spring seat 42 receives input from the coil springs 31, 32 via the overhang portions 44, and the overhang portions 44 and the seat portions 43 are elastically deformed in the device axial direction, as illustrated in FIG. 7C.

Since the input is absorbed by this elastic deformation of the second spring seat 42, input to the two clamping protrusions 46, 46 is small. In addition, since this input is received at the low-rigidity portion 46a in the position of the spring central axis Sc, the clamping protrusions 46, 46 also absorb the deformation of the seat portions 43 as described above. Therefore, the second spring seat 42 is elastically deformed following the deformation of the seat portion 43 while maintaining a state of sandwiching the attaching portion 24b of the intermediate plate-side support arm 24, as illustrated in FIG. 7C. In this manner, since the second spring seat 42 is deformed following the deformation of the coil springs 31, 32, stress is less likely applied to the coil springs 31, 32.

Next, the device axial direction input time when the coil springs 31, 32 are deformed in the device outer diameter direction, as illustrated in FIG. 4B, and the second spring seat 42 is displaced in the device outer diameter direction will be described. As described above, the contact pressure of the coil springs 31, 32 and the device inner diameter side of the seat portion 43 becomes stronger at the time of this deformation of the coil springs 31, 32 in the device outer diameter direction.

Therefore, the input from the coil springs 31, 32 to the clamping protrusion 46 is carried from the inner diameter side where this contact pressure is strong toward the high-rigidity portion 46b, as illustrated by the arrow F in FIG. 7A. When the two plates 1, 2 are relatively displaced in the device axial direction, the overhang portions 44 are separated in the outer diameter direction from the input position from the coil springs 31, 32, so an input that interposes the overhang portions 44 is less likely to occur.

Therefore, elastic deformation in the input direction is not likely to occur in the clamping protrusion 46, when there is input to the high-rigidity portion 46b having a relatively high rigidity. Accordingly, the second spring seat 42 changes the inclination with respect to the intermediate plate-side support arm 24 while maintaining the shape of the clamping protrusions 46, 46, as illustrated in FIG. 7B. In this case, the deformation amount of the coil springs 31, 32 in the device axial direction is small, and the deformation amount of the overhang portions 44 is also small. In addition, at this time, the strength of the clamping protrusion 46, 46 is secured by the ribs 46a, 46a, and therefore damage is less likely to occur thereto.

The effects of the braking control apparatus of the first embodiment are listed below. 1) A damper device comprising: a first coil spring 31 and a second coil spring 32, which are interposed in the circumferential direction between a hub plate 1 as a first rotating body and an input-output plate 2 as a second rotating body, in which two ends thereof are supported to a hub plate-side support arm 11 and an intermediate plate-side support arm 24 of the plates 1, 2, orienting the direction along a spring central axis, which is the center of winding, toward the circumferential direction; and a first spring seat 41 and a second spring seat 42 made of resin having a metallic core member 45 inside, which are attached to the support arms 11, 24, in a state in which the two ends of the coil springs 31, 32 in the direction along the spring central axis Sc are supported; wherein the two spring seats 41, 42 comprises a seat portion 43 on which the ends of the coil springs 31, 32 in the direction along the spring central axis are seated, and an overhang portion 44 which is extended from a device outer diameter direction end of the plates 1, 2 in this seat portion 43 in the circumferential direction and covers the device outer diameter direction of the coil springs 31, 32, the metallic core member 45 comprises an overhang metallic core part 452 which is extended from the overhang portion 44 at an outer diameter direction position on the spring central axis Sc, and the overhang metallic core part 452 comprises a low-rigidity portion 452a that is provided on a side close to the seat portion 43 in the circumferential direction with a relatively lower rigidity, and a high-rigidity portion 452b that is provided on a side far from the seat portion 43 in the circumferential direction with a relatively higher rigidity. Therefore, during a rotation of the damper device A, when the coil springs 31, 32 are relatively displaced with the spring seats 41, 42, since the spring seats 41, 42 are made of resin, friction resistance can be suppressed more inexpensively that those made of metal. In addition, an overhang metallic core part 452 is provided to the overhang portion 44 to which is applied pressure when the coil springs 31, 32 are deformed in the device outer diameter direction following the rotation of the damper device A; moreover, a high-rigidity portion 452b is provided on the distal end portion side of the overhang portion 44, which is pressed more strongly. Accordingly, even though the spring seats 41, 42 are made of resin, generation of damages when the pressing force described above is repeatedly inputted can be suppressed. Furthermore, the overhang metallic core part 452 is provided with a low-rigidity portion 452a on the side that is close to the seat portion 43. Accordingly, if pressure is applied to the overhang portion 44 in the outer diameter direction by the coil springs 31, 32 as described above, the overhang portion 44 is able to deform following the coil springs 31, 32 by comprising the low-rigidity portion 452a, even though an overhang metallic core part 452 is provided. Therefore, in each of the coil springs 31, 32, excessive deformation such as that illustrated in FIG. 8 can be suppressed from occurring between a site that abuts the overhang portion 44 and that is covered by the overhang portion 44 and a site that is not covered by the overhang portion 44. Thus, damages to the coil springs 31, 32 caused by this type of excessive deformation can be suppressed.

2) The damper device of the first embodiment wherein the overhang metallic core part 452 is formed of a thin metal plate, and the rigidity of the high-rigidity portion 452b is increased by being formed wider than the low-rigidity portion 452a. Therefore, the steps to increase rigidity is easy, having excellent manufacturability. Moreover, when the coil springs 31, 32 are deformed in the device outer diameter direction by centrifugal force, the range of the distal end portion of the abutting overhang portion 44 that is reinforced by the metallic core member 45 can be expanded in the circumferential direction of the overhang portion 44; therefore, tip split occurring in the overhang portion 44 can be more reliably suppressed.

3) The damper device of the first embodiment wherein the overhang metallic core part 452 is formed in a T-shape in plan view from the high-rigidity portion 452b and the low-rigidity portion 452a. Therefore, the regions having different rigidities of the high-rigidity portion 452b and the low-rigidity portion 452a can be securely set separately. In addition, since the width of the low-rigidity portion 452a is made constant, stress being concentrated in a location of the low-rigidity portion 452a that is particularly narrowed in width when the overhang portion 44 is deformed can be suppressed, to ensure durability. Additionally, in the high-rigidity portion 452b as well, since the high-rigidity range described in (2) above can be expanded in the circumferential direction of the overhang portion 44, the effect of suppressing an occurrence of a tip split in the overhang portion 44 can be reliably exerted. In this case as well, stress being concentrated in particular locations can be suppressed to ensure durability, by making the width of the high-rigidity portion 452b constant.

4) The damper device of the first embodiment wherein the overhang metallic core part 452 is provided exposed in the inner diameter direction (device inner diameter direction) of the rotating body, with respect to the overhang portion 44. Therefore, when the coil springs 31, 32 are deformed in the device outer diameter direction by centrifugal force, the device inner diameter direction side of the overhang portion 44 is rubbed therewith. Accordingly, the resin material being worn by this rubbing can be suppressed by exposing the overhang metallic core part 452.

5) The damper device of the first embodiment wherein a guide protrusion 43c, which is inserted in the inner perimeter of the coil springs 31, 32 to restrict the movement of the coil springs 31, 32 in a direction perpendicular to the spring central axis, is projected from the seat portion 43, and the low-rigidity portion 452a is provided further to the distal end direction side position of the overhang portion 44 than the guide protrusion 43c, in the circumferential direction. Therefore, when the coil springs 31, 32 are deformed in the device outer diameter direction by centrifugal force, the overhang portion 44 can be reliably deformed, following the deformation of the portion that is not restricted from moving by the guide protrusion 43c.

Other embodiments of the present invention will be described next. Since the other embodiments are modified examples of the first embodiment, configurations common to the first embodiment are given the same reference symbols as the first embodiment and the descriptions thereof are omitted, while describing only the differences from the first embodiment.

FIG. 10A-FIG. 10H illustrate respective modified examples of the overhang metallic core part 452. The overhang metallic core parts 201-206 illustrated in FIG. 10A-FIG. 10F are each configured so that the low-rigidity portions 201a-206a as a whole are formed narrower in width than the high-rigidity portions 201b-206b, with the widths thereof being formed constant. On the other hand, the high-rigidity portions 201b-206b each comprise portions that are wider than the low-rigidity portions 201a-206a, and are configured so that the widths are varied along the device circumferential direction.

Figure 10A:
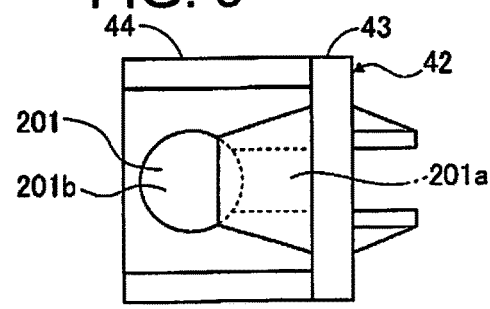
FIG. 10A is a view illustrating a modified example of the overhang metallic core part, and a bottom surface view of the second spring seat when viewed from the device inner diameter direction, as another embodiment of the present invention.
Figure 10B:
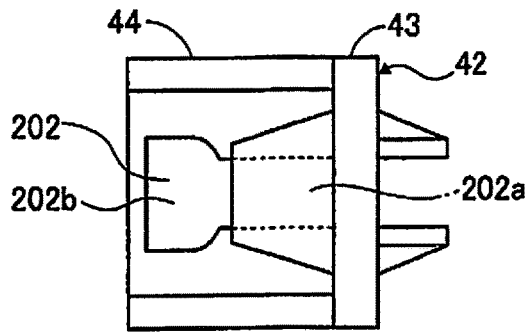
FIG. 10B is a view illustrating a modified example of the overhang metallic core part, and a bottom surface view of the second spring seat when viewed from the device inner diameter direction, as another embodiment of the present invention.
Figure 10C:
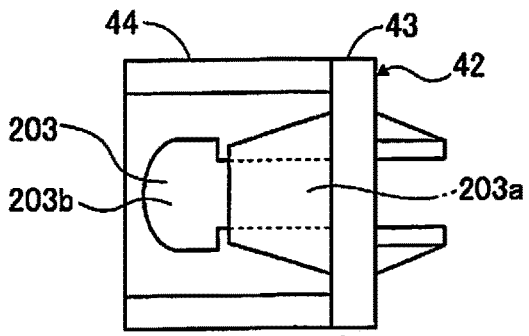
FIG. 10C is a view illustrating a modified example of the overhang metallic core part, and a bottom surface view of the second spring seat when viewed from the device inner diameter direction, as another embodiment of the present invention.
Figure 10D:
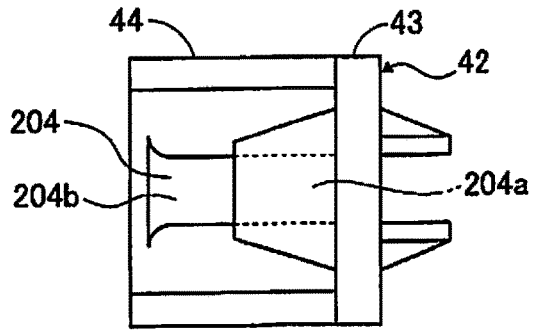
FIG. 10D is a view illustrating a modified example of the overhang metallic core part, and a bottom surface view of the second spring seat when viewed from the device inner diameter direction, as another embodiment of the present invention.
Figure 10E:
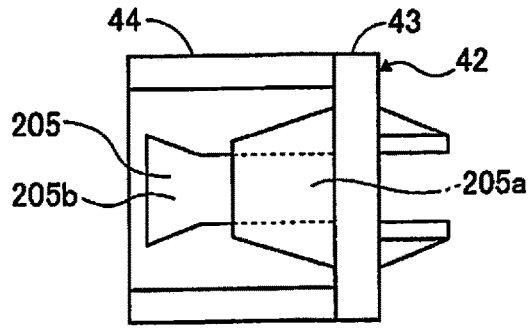
FIG. 10E is a view illustrating a modified example of the overhang metallic core part, and a bottom surface view of the second spring seat when viewed from the device inner diameter direction, as another embodiment of the present invention.
Figure 10F:
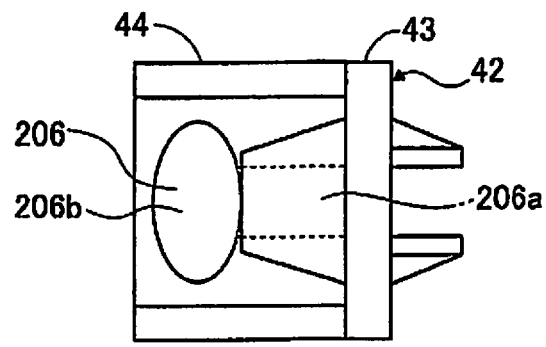
FIG. 10F is a view illustrating a modified example of the overhang metallic core part, and a bottom surface view of the second spring seat when viewed from the device inner diameter direction, as another embodiment of the present invention.
Figure 10G:
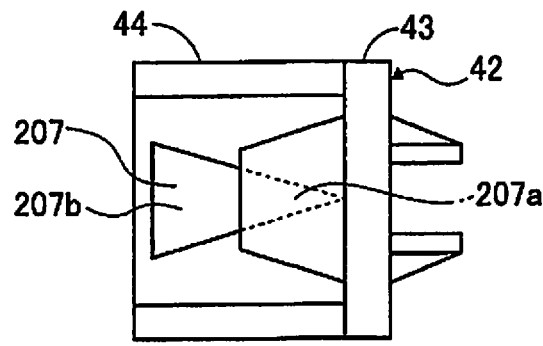
FIG. 10G is a view illustrating a modified example of the overhang metallic core part, and a bottom surface view of the second spring seat when viewed from the device inner diameter direction, as another embodiment of the present invention.
Figure 10H:
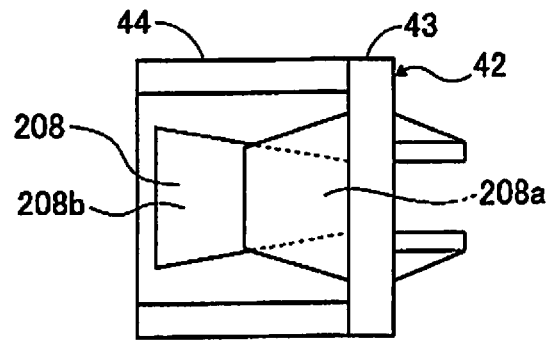
FIG. 10H is a view illustrating a modified example of the overhang metallic core part, and a bottom surface view of the second spring seat when viewed from the device inner diameter direction, as another embodiment of the present invention.

The overhang metallic core parts 207, 208 illustrated in FIG. 10G and FIG. 10H are each formed to have a shape that is gradually widened from the low-rigidity portions 207a, 208a toward the distal end of the high-rigidity portions 207b, 208b. In this example, the overhang portion 44 becomes lower in rigidity and is more easily deformed, when closer to the seat portion 43.

The embodiments of the present invention were described above based on the drawings, but specific configurations thereof are not limited to these embodiments, and various modifications and additions to the design can be made without departing from the scope of the invention according to each claim in the Claims.

In the present embodiment, an example was shown in which the damper device of the present invention is installed between the engine and the motor of a hybrid vehicle, but the device can be mounted on a vehicle other than a hybrid vehicle. In other words, the device may be provided between the engine and the transmission. In addition, an example was shown in the embodiment in which the difference in the rigidity of the low-rigidity portion and the high-rigidity portion is set in the overhang metallic core part by different widths of the metal plate member, but the invention is not limited thereto. For example, the rigidity may be varied by making the plate thickness of the high-rigidity portion thicker than the plate thickness of the low-rigidity portion, or, the rigidity may be varied by a combination of a difference in the plate thickness and a difference in the width of the plate material.

The invention claimed is:

1. A damper device comprising:
   a first rotating body;
   a second rotating body;
   a coil spring interposed in a circumferential direction between the first rotating body and the second rotating body with respect to a center rotation of the damper device, the coil spring having a first end and a second end each supported to the first and second rotating bodies, the first and second ends of the coil spring being oriented orienting a direction along a spring central axis, which is a center of winding, toward the circumferential direction; and
   a resin spring seat having a metallic core member inside, the resin spring seat being attached to one of the first and second rotating bodies, in a state in which the first and second ends of the coil spring are supported in the direction along the spring central axis,
   the resin spring seat comprising:
   a seat portion on which one of the first and second ends of the coil springs are seated in the direction along the spring central axis, and
   an overhang portion extending in the circumferential direction from an outer diameter end of the seat portion with respect to the center rotation of the damper device and covering an outer diameter side of the coil spring with respect to the center rotation of the damper device, and the metallic core member comprising an overhang metallic core part extending from the overhang portion at an outer diameter direction position on the spring central axis, and the overhang metallic core part comprising a low-rigidity portion that is provided on a side close to the seat portion in the circumferential direction, and a high-rigidity portion that is provided on a side far from the seat portion in the circumferential direction, the high-rigidity portion having a relatively higher rigidity with respect to a relatively lower rigidity of the low-rigidity portion, the overhang metallic core part being a top portion of the overhang portion in the device outer diameter direction.

2. The damper device according to claim 1, wherein the overhang metallic core part is formed of a metal plate, and the rigidity of the high-rigidity portion is increased by being formed wider than the low-rigidity portion.

3. The damper device according to claim 2, wherein the overhang metallic core part has a T-shape as viewed in a plan view from the high-rigidity portion and the low-rigidity portion.

4. The damper device according to claim 3, wherein the overhang metallic core part is exposed in an inner diameter direction of the first and second rotating body bodies, with respect to the overhang portion.

5. The damper device according to claim 3, wherein the resin spring seat further comprises a guide protrusion protruding from the seat portion into an inner perimeter of the coil spring to restrict the movement of the coil spring in a direction perpendicular to the spring central axis, and the low-rigidity portion is provided further from the distal end direction side position of the overhang portion than the guide protrusion, in the circumferential direction.

6. The damper device according to claim 2, wherein the overhang metallic core part is exposed in an inner diameter direction of the first and second rotating body bodies, with respect to the overhang portion.

7. The damper device according to claim 2, wherein the resin spring seat further comprises a guide protrusion protruding from the seat portion into an inner perimeter of the coil spring to restrict the movement of the coil spring in a direction perpendicular to the spring central axis, and the low-rigidity portion is provided further from the distal end direction side position of the overhang portion than the guide protrusion, in the circumferential direction.

8. The damper device according to claim 1, wherein the overhang metallic core part is exposed in an inner diameter direction of the first and second rotating body bodies, with respect to the overhang portion.

9. The damper device according to claim 8, wherein the resin spring seat further comprises a guide protrusion protruding from the seat portion into an inner perimeter of the coil spring to restrict the movement of the coil spring in a direction perpendicular to the spring central axis, and the low-rigidity portion is provided further from the distal end direction side position of the overhang portion than the guide protrusion, in the circumferential direction.

10. The damper device according to claim 1, wherein the resin spring seat further comprises a guide protrusion protruding from the seat portion into an inner perimeter of the coil spring to restrict the movement of the coil spring in a direction perpendicular to the spring central axis, and the low-rigidity portion is provided further from the distal end direction side position of the overhang portion than the guide protrusion, in the circumferential direction.

* * * * *